United States Patent
Lutze et al.

(10) Patent No.: US 8,405,000 B2
(45) Date of Patent: Mar. 26, 2013

(54) METHOD FOR PRODUCING A SERIES OF THROUGH HOLES IN A LAYER OF MATERIAL BY MEANS OF A LASER BEAM

(75) Inventors: Walter Lutze, Jena (DE); Martin Griebel, Jena (DE); Michael Nittner, Camburg (DE)

(73) Assignee: Jenoptik Automatisierungstechnik GmbH, Jena (DE)

( * ) Notice: Subject to any disclaimer, the term of this patent is extended or adjusted under 35 U.S.C. 154(b) by 801 days.

(21) Appl. No.: 12/547,943

(22) Filed: Aug. 26, 2009

(65) Prior Publication Data

US 2010/0059489 A1    Mar. 11, 2010

(30) Foreign Application Priority Data

Sep. 11, 2008  (DE) .......................... 10 2008 047 239

(51) Int. Cl.
*B23K 26/00* (2006.01)
(52) U.S. Cl. ............ 219/121.71; 219/121.7; 219/121.72
(58) Field of Classification Search ............. 219/121.71, 219/121.7, 121.67, 121.72
See application file for complete search history.

(56) References Cited

U.S. PATENT DOCUMENTS 7,440,097 B2 * 10/2008 Benicewicz et al. .......... 356/316

FOREIGN PATENT DOCUMENTS

| DE | 39 13 785 A1 | 10/1990 |
| DE | 41 24 162 C1 | 12/1992 |
| DE | 102 61 667 A1 | 7/2004 |

* cited by examiner

*Primary Examiner* — Kevin M Picardat
(74) *Attorney, Agent, or Firm* — Duane Morris LLP

(57) ABSTRACT

The present invention relates to the production of a series of holes in a layer of material, in particular to the production of a target rupture line in a first layer of an airbag cover. The radiation of a plasma that forms during the production of each hole is detected from the surface that is being machined. From the signal pattern derived, the time of the beginning of the signal and the time of the appearance of a falling edge that meets a predetermined edge criterion are detected and stored. The point in time at which the falling edge appears is a switching criterion for switching off the laser. The difference between the two points in time stored for each hole constitutes a quality criterion for the respective hole.

8 Claims, 1 Drawing Sheet

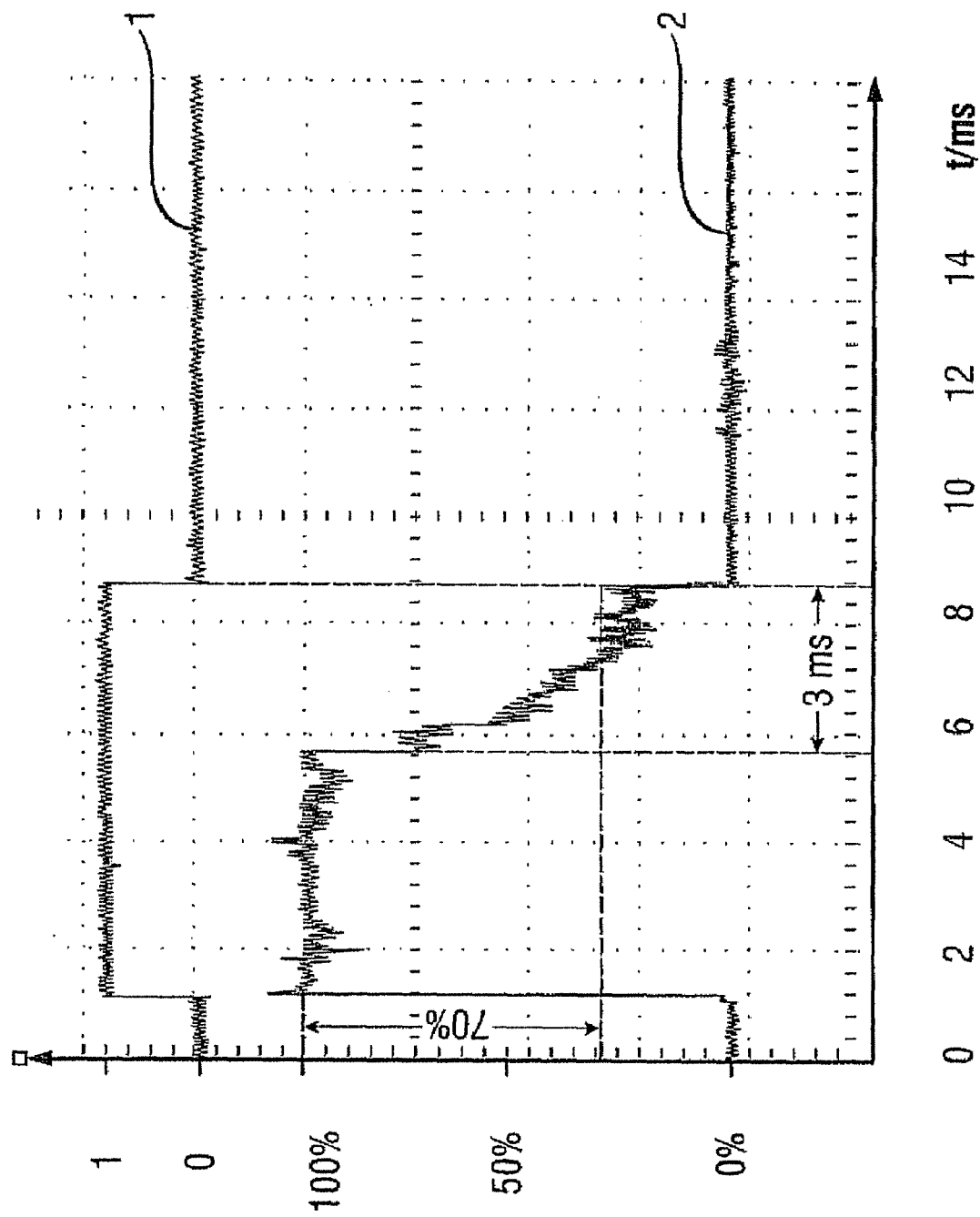
ms = msec

METHOD FOR PRODUCING A SERIES OF THROUGH HOLES IN A LAYER OF MATERIAL BY MEANS OF A LASER BEAM

FIELD OF THE INVENTION

The present invention relates to a method for producing a series of through holes (holes) in a layer of material, which layer of material is the first layer of a multilayer workpiece or constitutes a single-layer workpiece, which workpiece is, in particular, an airbag cover.

The closest prior art is DE 39 13 785 A1.

BACKGROUND OF THE INVENTION

To produce holes that extend entirely through a layer of material, it must be ensured that the laser beam is switched off only after the material in the area of the hole has been completely ablated. Due to fluctuations in the process parameters, for example, laser power and focus position, or in the properties of the layer of the material, for example, fluctuations in the density of the material or deformations, it is not possible to ensure this type of complete ablation of material by setting a fixed working time or pulse sequence, so it is common practice to monitor the ablation of the material and to switch off the laser immediately after each hole has been completed, thereby ensuring that additional laser power is not generated unnecessarily, which could potentially damage other layers, and that the diameter of the hole on the exit surface is kept small.

In procedures in which the laser beam as a tool is directed in a permanently fixed position onto the surface of the workpiece and the workpiece is moved relative to the laser beam to produce a series of holes at certain intervals from one another in the workpiece, the entire ablation of the material can be monitored, e.g., by means of a sensor which is disposed in a permanently fixed position on the surface of the workpiece facing away from the laser beam and which detects the exiting laser beam.

In contrast, in procedures in which the workpiece is mounted in a permanently fixed position and the tool, i.e., the laser beam, is moved relative to the workpiece, monitoring by means of a sensor that is disposed on the surface facing away from the laser beam is not useful. Since the relation between the position of the sensor and the position of the laser beam must always be fixed, the sensor and the laser beam must be moved together relative to the workpiece. This entails a greater degree of complexity in terms of construction and control technology and, consequently, a higher susceptibility to breakdowns.

Another disadvantage of disposing a sensor on the surface facing away from the laser beam is that such configurations and methods associated with such configurations cannot be used when the workpiece is a multilayer structure and the holes are to be produced only in the first layer of the material.

In addition to monitoring the ablation of material for the purpose of switching off the laser beam after a hole has been completed, certain applications in which the workpieces are to be used make it necessary to detect a quality parameter for the hole while the hole is being produced, which quality parameter makes it possible to decide whether the workpiece produced with the series of holes is to be classified as conforming or nonconforming.

In particular, when the material layer is a layer of an airbag cover and the series of holes form a predetermined rupture line, it is especially important for the diameters of the holes to be within a narrow tolerance range. The hole diameters and the hole spacings as geometric parameters and the bursting strength of the material are jointly responsible for the tear resistance of the predetermined rupture line, which is why the focus position must be kept stable throughout the process.

Since an airbag cover is a safety-relevant component, the predetermined rupture line of which must reliably burst open at a defined bursting force when an airbag disposed behind the airbag cover is activated, automobile manufacturers as a rule are not satisfied with proof of the technical stabilization of process parameters, but demand 100% quality control and quality documentation which, for reasons of efficiency, have to be performed during the production process.

PRIOR ART

DE 39 13 785 A1 discloses an ablation method by means of a laser beam and a device suitable for use in said method, in which the ablation of a second material from a first material is to be controlled by monitoring the presence of the second material in the plasma that forms during the ablation by means of at least one radiation detector. To this end, the radiation detector measures the intensity of the radiation caused by the plasma in the wavelength ranges that are characteristic for the second material. Thus, e.g., when the sensor no longer generates a signal or generates only a low signal, it is possible to determine that only an insignificant amount of the second material, if any, is present on the first material and that machining can be stopped.

The method described is said to be useful for removing deposits of plastic material from the electrical connections of electrical or electronic components that are coated with plastic.

The plasma radiation is detected solely to terminate the machining process as a function of the signal amplitude supplied by the radiation detector, which amplitude is proportional to the detected radiation intensity, as soon as the signal amplitude drops below a predetermined value.

No mention is made that this method can be used to control the process during the production of holes.

DE 41 24 162 C1 discloses a method and a device for optimizing the quality while machining material by means of a laser beam, in particular for cutting ceramic workpieces.

To perform this procedure, a laser beam is directed onto the upper surface of a workpiece that is to be machined, and the light signals emanating from the plasma that forms are detected by means of photodiodes. The test signals, which are a measure of the intensity of the plasma radiation that impinges upon the receiver surfaces of the photodiodes, are recorded in a process computer which calculates the average intensity of the plasma radiation based on these signals. The process computer compares this average plasma radiation intensity to a target value and, depending on the deviation from this target value, generates control signals for a control device for controlling the feed of the workpiece as well as control signals for a control device for changing the scanning frequency of the laser or for changing the laser power so as to minimize the deviations of the measured average plasma radiation intensity from the target value. To this end, the scanning rate of the process computer used is identical to the pulse frequency of the laser.

To detect the passage of the laser beam through the workpiece, a second photodiode is disposed on the lower surface that faces away from the laser beam.

As described in this document, the process parameters and the termination of the process are controlled by the test signals of two photodiodes.

DE 102 61 667 A1 describes a method and a device for laser cutting a workpiece by moving a laser beam along a predetermined cut line, in the area of which a plasma extending in the direction of the movement of the laser beam forms, which plasma is continuously observed, and at least one observed characteristic of the plasma is correlated with the quality of the cutting procedure that is being performed.

On the assumption that good cutting results are obtained when the visible plasma that forms in the cut line at the site of the laser beam is substantially unchanged along the entire length of the cut line, i.e., especially when the intensity of the light emanating from the plasma is constant, the quality of the cut produced can be directly evaluated by observing, e.g., the intensity during the process. If momentary variations are observed in the plasma, e.g., due to defects in the material, or permanent variations due to instrument errors, these variations are indicative of a cutting process of inferior quality, and the workpieces affected can be separated out as nonconforming parts while the process continues.

In this case, observing the plasma serves exclusively to monitor the process, not to control the process.

OBJECTS OF THE INVENTION

The problem to be solved by the present invention is to make available a method by means of which a series of holes can be produced by means of a laser in a layer of material, in particular a layer of an airbag cover, which method ensures the generation of complete holes and establishes a criterion for the quality of the holes.

This problem is solved by a method with the features set forth in the annexed claims.

BRIEF DESCRIPTION OF THE DRAWINGS

The present invention will be described in greater detail based on a practical example illustrated in the annexed drawing, in which FIG. 1 shows the signal pattern of the radiation detector during the switch-on phase of the laser.

DESCRIPTION OF THE EMBODIMENTS

The layer of material into which a series of through holes are to be cut can be a single-layer workpiece or a first layer of a multilayer workpiece.

Thus, if the workpiece is used as an airbag cover, it can be a single-layer airbag cover or a support layer of a multilayer airbag cover.

The support layer can be machined before it is laminated to the other layers, which can be simply a decorative layer or a decorative layer with an interlining layer, e.g., a foamed layer or a spacer fabric, which ensures a soft feel of the airbag cover.

The support layer can also be machined after all of the layers have been laminated to one another.

To implement the method, the workpiece to be machined is attached to a stationary workpiece holder, and a laser beam is directed onto the surface, in particular the back surface, of the workpiece and moved relative to the workpiece along a predetermined direction of the series of holes that are to be produced.

The laser emitting the laser beam is activated in such a manner that it is switched on whenever the beam axis reaches a position, relative to the workpiece, in which a hole is to be produced.

In the region in which the laser beam is active, the material is vaporized and ionized, and plasma forms.

Similarly as in the method described in DE 39 13 785 A1, the laser is to be switched off as a function of the plasma, to which end a radiation detector is disposed in a fixed position relative to the laser beam and directed onto the point of impingement of the laser beam. This radiation detector responds to the wavelength range of the plasma radiation that is generated by the material to be processed, but not to the wavelength range of the laser beam.

If the layer of material is the first layer of a multilayer workpiece, plasma forming from the material of the subsequent layer either must not emit radiation in a wavelength range that is detected by the radiation detector or it must have a markedly lower density than the material of the first layer, which also markedly reduces the quantity of a potentially forming plasma.

However, the switching criterion used for switching off the laser beam is not whether a value measured falls below or reaches a predetermined target value; instead, the criterion is the detection of a predetermined percent signal drop while the laser is active, which signal drop mirrors a predetermined drop in the intensity of the plasma radiation. This signal drop will subsequently be referred to as falling edge.

The use of the falling edge as a switching criterion has the advantage that it is not necessary to determine, in advance of the procedure or at the beginning of the procedure, a material-specific target value to which the signal must be compared.

All that is required is to ensure that the radiation intensity of the plasma detected by the radiation detector is within the sensitivity range of the plasma. Thus, the drop in the signal amplitude by a predetermined percentage within a predetermined edge duration is detected as the falling edge.

The percent drop should be at least 30%, e.g., 70%, and the edge duration should be shorter than 10 msec, e.g., 3 msec. FIG. 1 represents the control of the laser power over time (curve 1, top) and the signal pattern of the radiation detector over time (curve 2, bottom).

Thus, the switching criterion is independent of potential small fluctuations in the signal pattern and the absolute signal amplitudes which can differ considerably for different materials.

In addition to switching off the laser beam, a quality criterion for the hole formation is to be obtained from the plasma that forms.

In contrast to prior-art methods in which properties, in particular the radiation intensity of the plasma, are observed and used throughout the process to draw conclusions as to the ablation quality, the method proposed by the present invention completely ignores the properties of the plasma.

Instead, the quality criterion is the detected length of time, beginning with the generation of a signal up to the detection of the falling edge.

Given highly stable process parameters, i.e., laser power, pulse frequency and pulse duration, this detected length of time can deviate from a predetermined target length of time, in particular as a result of a change in the focus position.

A change in the focus position is caused primarily by variations in the geometric shape of the workpiece, i.e., by deformations. As a consequence of these deformations, the position of the workpiece relative to the focus of the laser beam is not consistent with the target position, which can cause the diameters of the holes to deviate from the target diameter of the holes.

Larger or smaller hole diameters have the effect that, given otherwise constant process parameters, more or less material is ablated, vaporized as well as ionized. This means that the detected length of time is commensurately greater or smaller.

The target length of time is determined by producing a reference hole in a position between the laser beam and the workpiece, in which position the correctly adjusted focus position is ensured.

In the course of the process, the holes of the series to be formed are produced one after the other while the radiation detector detects the plasma radiation that forms. The signal pattern that forms for each hole in the detector is transmitted to a central processor where it is compared to an edge criterion. The edge criterion is met when a predetermined percent drop in the signal amplitude is detected.

Immediately after determining that the edge criterion has been met, the laser is switched off and thereafter switched on again only after the laser beam has reached the position for the next hole.

The duration of the plasma radiation during the production of each hole is determined by calculating the difference between the time at which the signal begins and the time at which the falling edge is detected and by storing the difference in such a manner that it is linked to each respective hole.

The time at which the signal begins can be the sensitivity limit of the detector or a predetermined threshold value.

Lastly, a check is made to determine whether the time values linked to the holes are within a predetermined tolerance window and thus to determine whether the quality of the holes is within the tolerance limits or outside the tolerance limits. If a falling edge that meets the edge criterion is not detected within a predetermined length of time, the laser is switched off and the hole involved is classified as defective.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A method for producing a series of holes in a layer of material by means of a laser beam which is emitted from a laser and directed onto the layer of the material thereby forming a plasma as a result of the ablation of the material, said plasma being detected and a signal being generated from which a switching criterion for switching off the laser is derived, comprising:

generating a signal during the production of each individual hole, detecting the time of the beginning of said signal generation and the time of the appearance of a falling edge that meets a predetermined edge criterion; storing said detected times so that they can be linked to each respective hole; switching off said laser at the time that a falling edge is detected relative to intensity of plasma radiation, said detected falling edge indicating the production of one individual hole; calculating a length of time based on the difference between the two times detected for each hole; and comparing said length of time to a predetermined target length of time, as the quality criterion for the hole involved.

2. The method as in claim 1, wherein the edge criterion is a drop in the signal amplitude by a value greater than a predetermined percentage.

3. The method as in claim 2, wherein the percentage drop of the signal amplitude is greater than 30%.

4. The method as in claim 2, wherein the percentage drop of the signal amplitude is greater than 70%.

5. The method as in claim 2, wherein the drop takes place within a time period of 10 msec.

6. The method as in claim 2, wherein the drop takes place within a time period of 3 msec.

7. The use of a method as in claim 1 in the production of a target rupture line consisting of a series of holes in an airbag cover.

8. The method as in claim 1, wherein when no falling edge that meets the edge criterion is detected, the hole involved is classified as defective.

* * * * *